United States Patent [19]
Steele et al.

[11] Patent Number: 5,439,031
[45] Date of Patent: Aug. 8, 1995

[54] HEAT SHRINKABLE END CAPS

[75] Inventors: Robert E. Steele, Richmond Hill; Peter Jackson, Etobicoke; Marcus P. W. Heydrich, Mississauga, all of Canada

[73] Assignee: Shaw Industries Ltd., Rexdale, Canada

[21] Appl. No.: 150,880

[22] Filed: Nov. 12, 1993

[51] Int. Cl.⁶ .............................................. F16L 55/10
[52] U.S. Cl. .................................. 138/89; 138/96 R; 138/178; 138/DIG. 1; 264/515
[58] Field of Search .............. 138/89, 96 R, 89.1, 138/137, 141, 140, 178; 264/230, 248, 150, 515

[56] References Cited

U.S. PATENT DOCUMENTS

| | | | |
|---|---|---|---|
| 2,997,411 | 8/1961 | Woolley | 264/248 |
| 3,040,385 | 6/1962 | Folta | 264/230 |
| 3,448,182 | 6/1969 | Derbyshire et al. | |
| 3,582,457 | 6/1971 | Barthell | |
| 3,624,594 | 11/1971 | Trimble et al. | 138/89 |
| 3,631,897 | 1/1972 | Fisher et al. | 138/141 |
| 3,847,183 | 11/1974 | Meyer | |
| 3,906,070 | 9/1975 | Lajovic | 138/96 R |
| 4,207,364 | 6/1980 | Nyberg | 138/178 |
| 4,297,155 | 10/1981 | Jervis | |
| 4,356,046 | 10/1982 | Yamazaki et al. | |
| 4,469,357 | 9/1984 | Martin | 285/381 |
| 4,504,699 | 3/1985 | Dones et al. | |
| 4,569,868 | 2/1986 | De Blauwe et al. | 138/89 |
| 4,579,148 | 4/1986 | Sovish et al. | 138/89 |
| 4,717,608 | 1/1988 | Meltsch | |
| 4,722,471 | 2/1988 | Gray et al. | |
| 4,757,595 | 7/1988 | Fraering, Jr. | 138/967 |
| 5,288,532 | 2/1994 | Juhl et al. | 138/118.1 |

*Primary Examiner*—David A. Scherbel
*Assistant Examiner*—James F. Hook
*Attorney, Agent, or Firm*—Ridout & Maybee

[57] ABSTRACT

Heat-shrinkable cap comprising a heat-shrinkable tube sealed at one end by heat recovering that end of tube over a dimensionally stable, solid plug. The tube and plug are mutually weldable under heat, or are bonded together, thereby providing an air and water-tight seal at the sealed end. The open end of the cap may be internally coated with adhesive to provide an air and water-tight seal over an object such as a cable-end when the cap is heat recovered over said object.

25 Claims, 1 Drawing Sheet

HEAT SHRINKABLE END CAPS

The present invention relates to a heat shrinkable end cap for use in closing and sealing the ends of cables and the like, for example.

Such end caps are known from U.S. Pat. Nos. 3,582,457 (Barthell) and 3,847,183 (Meyer). The known items are made by moulding a tubular member having one end open and the other end closed. This moulding must be crosslinked, which is typically accomplished partially or completely during the moulding cycle, but which may also be accomplished subsequent to demoulding by exposing the moulding to very high energy gamma or electron radiation. After crosslinking, the moulding is then heated to a temperature above the decrystallization temperature of the shape-retaining polymer, expanded mechanically or pneumatically, and cooled while still in the expanded state. Finally, the expanded moulding is trimmed and, most commonly, coated partially with an adhesive.

This method suffers from a number of disadvantages, among which are included:

1. The moulds and moulding equipment are expensive, and each size and length of cap requires its own mould (or inserts) and expansion dies.
2. The in-situ crosslinking method requires long mould cycles to achieve a high enough green strength to demould the part without tearing.
3. The mouldings are material-wasteful, being typically designed with a large "brim" around the open end. This "brim" functions as a gripping surface during expansion, and is later trimmed off. On small mouldings, it may comprise half the weight of the moulding and, because it is crosslinked, it cannot be recycled.
4. The length of the finished piece is limited by the length of the initial moulding. If a specific application required a longer length, a completely new set of moulds and expansion dies would be required.
5. Expansion ratios above 2:1 are difficult to achieve because of the bi-directional expansion forces acting on the end portion of the moulding.

It is also known to form end caps by crimping and heating one end of a heat shrinkable tube, as described in Derbyshire et al U.S. Pat. No. 3,448,182, but the strengths, such as burst strengths, of the resulting products are not as great as may be desired, and such caps can be prone to reopening when recovered.

U.S. Pat. No. 4,504,699 to Dones shows heat shrinkable sleeves for use in forming sealed connections between wires. One end of the sleeve carries a plug of elastomer, gel, mastic or foam which is retained within a shrunk down end of the sleeve, or is snap fitted, or bonded in place, or is introduced as a liquid and cured in place. The plug material is however a relatively easily deformable self-sealing material allowing a probe to be passed through it and would not normally provide the strength and integrity required for cable end caps and the like.

It is an objective of the present invention to overcome many of the disadvantages of previous methods. In one aspect the present invention provides a heat shrinkable end cap comprising a dimensionally heat unstable tubular member of polymeric material, said member shrinking in perimeter on application of heat thereto, and having a relatively wide and open first end portion and a relatively narrow second end portion that is closed by a solid crosslinked polymeric material plug that is welded to said second end portion. These caps can be manufactured conveniently by heat shrinking one end of a tubular member around the plug and applying sufficient heat to weld the plug and sleeve together. The resulting caps have excellent strength properties and can be made with high shrink ratios.

As noted above, the caps according to the above aspect have the plug welded to the tubular member. Such welding is readily recognizable by those skilled in the art as providing a bond which is different in character from other types of bonding such as adhesive bonding. The welded connection is also called by those skilled in the art a "fusion bond" to distinguish it from other types of connection such as an adhesive bond. In welding, the surfaces of the two materials merge or fuse together and, usually, when the welded product is subject to strength testing it fails cohesively; that is to say the interface between the two materials does not separate cleanly, but rather the product fails by failure of one of the components of the welded article at a non-welded portion and not at the weld itself.

In a second aspect the invention provides a heat shrinkable end cap comprising a dimensionally heat unstable tubular member of polymeric material, said member being capable of shrinking in perimeter on application of heat thereto, and having a relatively wide and open first end portion and a relatively narrow second end portion that is closed by a solid plug having a complex viscosity greater than $10^9$ poise when measured at a temperature of 23° C. and a strain rate of $10^{-1}$ radian s$^{-1}$, and which is bonded to said second end portion. The caps in accordance with this aspect of the invention provide excellent strength properties and can have high shrink ratios. The plug in this case may be adhesively bonded within the second end portion or may be provided by introducing a curable liquid precursor of solid polymer within the shrunk down second end portion and allowing it to cure, or it may be welded to the second end portion.

The above mentioned Dones et al patent 4,504,699 discloses sleeves having at one end a plug that is self-sealing when penetrated by a probe and does not have a high degree of stiffness. For example, the plugs in Dones have relatively low complex viscosities. By contrast, the plugs employed in the tubular members in accordance with the above-mentioned second aspect of the invention provide satisfactory strength properties useful for end caps, have relatively high stiffness and relatively high complex viscosities and as a result are not self-sealing. For example, the Dones et al patent teaches the use of self-sealing materials having a complex viscosity of not more than $10^9$ poise as measured by a mechanical spectrometer at a strain rate of $10^{-1}$ radian s$^{-1}$. The plug materials of the second aspect of the invention have a complex viscosity greater than $10^9$ poise when measured at a temperature of 23° C. and a strain rate of $10^{-1}$ radian s$^{-1}$. Preferably said complex viscosity is at least about $2 \times 10^9$ poise, more preferably at least about $4 \times 10^9$ poise.

Some of the preferred plug materials have a complex viscosity, as measured above, up to about $10^{11}$ poise. The mechanical spectrometer is conveniently usable for measuring complex viscosities up to about $10^{11}$ poise, but some of the preferred plug materials of the invention have such a high degree of stiffness that it is above this range. For such materials, the stiffness can be measured by determining the elastic modulus, as measured in accordance with the procedure given in ASTM D882. Preferably, the plug materials have an elastic modulus of at least $5 \times 10^2$ kPa, and up to about $10^8$ kPa, more preferably up to about $10^6$ kPa.

In use, the end caps of the invention may be applied over an object such as a cable end which it is desired to protect and seal and heat is applied to cause shrinking or recovery of the cap onto the cable end or other object so that the recovered cap tightly grips on and seals to the object.

The heat shrinkable tubular members in the present invention may be of any material that is capable of exhibiting the property of elastic memory after stretching or expansion to a heat unstable dimensional state. For example, the tubular member may be of a polymeric material which may or may not be crosslinked, for example polyvinylchloride. Preferably, the polymeric material is crosslinked. For example, the crosslinked polymeric material may comprise polyethylene, copolymers of polyethylene, such as ethylene vinyl acetate, ethylene methyl acrylate, ethylene ethyl acrylate, ethylene-propylene, ethylene-propylene-diene, or ethylene-vinyl-silane. Further examples of polymeric materials that may be used in crosslinked form include mechanical or reactive blends of polyethylene, polyethylene copolymers or polypropylene with non-crosslinked or partially crosslinked elastomers, such as those based on ethylene-propylene, nitrile, styrene-butadiene, isoprene and chlorinated elastomers, such materials being generically termed thermoplastic elastomers, thermoplastic vulcanizates or melt processible rubbers. Further examples include curable elastomers based on ethylene-propylene, silicone, isobutylene, butadiene, chloroprene, and chlorinated polyethylene. Preferred materials include more generally any polymeric material capable of being radiation or chemically crosslinked, and non-crosslinked polymeric materials, exhibiting the property of elastic memory after stretching or expansion to a mechanical or heat unstable dimensional state. Thus, examples of further polymeric materials that may be used include blends of polyethylene with ethylene copolymers or thermoplastic elastomers or curable elastomers.

Any or all of the above materials may be used in the form of an unfilled composition or as a composition containing additives such as antioxidants; stabilisers; inorganic mineral fillers, including conductive fillers and reinforcing fibres; inorganic or organic flame retardants; crosslinking promoters or accelerators; processing aids; and pigments, at a typical loading of about 1 to about 75% by weight of the total composition. In the presently preferred form, the tubular member comprises a crosslinked blend of polyethylene and polyethylene copolymer containing typically 30 to 50% by weight of additives.

The tube member may or may not be internally coated with a curable or non-curable adhesive, sealant, mastic or other bonding agent. Such internal coating may preferably cover the entire length of the tubing except for a section of one end of the tubing, that end being purposely left uncoated to accommodate a weldable sealing plug. Alternatively, the tubing may be coextruded with an internal adhesive layer which remains fusible on application of the tubing over the sealing plug. A further possibility is to use a tube member which is selectively crosslinked in the outer portion of its wall so that the inner portion and inner side remains relatively meltable and will bond adhesively when hot to the sealing plug. The internal coating preferably comprises a thermoplastic hot melt adhesive or sealant extending 10-50% the length of the tubing measured from the end opposite that to be sealed by recovery over the sealing plug.

The solid plug with which one end of the tubing is sealed should be a material that is both resistant to the temperatures encountered during manufacture and application of the end cap, and that welds or bonds firmly to the heat-shrinkable tubing under conditions required to effect an air and water-tight seal between the plug and tubing. The plug may be of identical or different composition to the tubing, and preferably is a blend of polyethylene and polyethylene copolymer in an uncrosslinked or crosslinked state. The plug may be coextruded with an outer layer of adhesive or material selectively crosslinked to be relatively meltable and bond adhesively when hot to the inner surface of the tubing.

The plug will be typically cylindrical in profile but may be of any other functional profile, for example, angular, such as square or octagonal, conical, serrated, and fluted. In addition, the plug may be threaded through its centre with a pneumatic valve for applications requiring internal pressurization. The plug may be preformed or formed in-situ with the preparation of the cap.

Plug materials other than those mentioned above may include other thermoplastic or thermoset polymers, including engineering thermoplastics, composites, laminates, and cellular foams, and inorganic materials such as glasses, ceramics and metals, which may, by themselves or through the addition of a functional chemical coating, co-extruded coating or interaction with an internal adhesive layer, co-extruded or otherwise applied, provide an air and water-tight seal between the plug and tube member. Examples of such materials are ionomers, acid-modified polyethylenes, nylon, crosslinked cellular polyolefins, fusion-bonded epoxy, fibre-reinforced polyester, phenolic resin, porcelain, alumina, steel, aluminum and copper.

In an example of a preferred process of manufacture of the end caps, tubing of required inside diameter and wall thickness is extruded onto bulk reels. As noted above, the tubing may be co-extruded with a fusible inner wall of adhesive material if so desired. The extruded tubing is preferably crosslinked by either irradiation crosslinking, such as by exposure to electron beam or $\gamma$-radiation, or by chemical crosslinking, for example through the use, as known by those skilled in the art, of peroxide, silane, metal oxide, or sulphur curing agents.

The tubing is preferably crosslinked to a degree of about 20% to about 90%, more preferably in the range about 40 to about 70%.

The tubing is rendered dimensionally heat unstable by a process familiar to those skilled in the art and which generally involves heating the tubing to a temperature above the crystalline melting point of the shape-retaining polymer component, introducing internal pneumatic pressure to cause the tubing to expand diametrically, cooling the tubing while retaining it in the expanded state, and finally exhausting the expansion gases. Typically the tubing is expanded to between about 25% and about 600% of its unexpanded diameter, and most commonly to between about 100% and 300% of its unexpanded diameter.

The expanded tubing is subsequently cut into discrete lengths, said lengths being determined by the desired working length of the caps to be produced. The total length will be the sum of the working length plus the length of the plug plus an amount taken by the transition from expanded to unexpanded diameter. The maximum total length is limited only by the total continuous length of continuous expanded tubing which can be attained, but most commonly the working length of the caps will be between about 25 mm. and about 300 mm.

If desired, the discrete tubing lengths are then internally coated with an adhesive material using techniques familiar to those skilled in the art, the length of the coated section being typically 25 to 50% of the tubing length. This adhesive lining will provide an air and water-tight encapsulation of the cable or other substrate over which the finished end-cap is finally recovered.

In the preferred form, the uncoated end of the tubing is heat recovered around a pre-cut length of a solid, typically cylindrical, heat-resistant polymeric plug, previously extruded to an outside dimension at least equivalent and, preferably, greater than the fully recovered inside diameter of the tubing, the heat applied and recovery force of the tubing being sufficient to effect an air and water-tight weld between the tubing and plug. The length of the plug is dependent upon the diameter and length of the tubing to which it is to be married, but would be typically 6 to 25 mm. The diameter of the plug should preferably be slightly larger than the fully recovered diameter of the tubing, typically by about 10%. Typically the plug is cross-linked to a degree of crosslinking in the range mentioned above for the tubing of about 20% to about 90%, more preferably in the range about 40% to about 70%.

The recovery of the tubing around the plug, and welding of the two components, may typically be accomplished using a directional, forced-air, heat gun, but may also be realised with conventional infra-red, ultrasonic, induction or microwave techniques.

In the case in which the plug does not weld to the tubing, for example in the case in which the plug is a foam, a glass, a metal, a ceramic or a composite material, the procedures described above are used except the interior of the tubing and/or the exterior of the plug is provided with an adhesive, sealant, mastic or other bonding agent, to provide an air and water-tight seal between the plug and the shrunk down or recovered end of the tubing.

If the tubing is prepared with a co-extruded adhesive layer, which may be of a material classed as a hot-melt adhesive or is a polymeric composition desensitized to the crosslinking process by the addition of conventional crosslinking retarders, then the adhesive layer will necessarily extend over the plug on recovery of the tubing over said plug, and an air and water-tight seal will again be effected.

Alternatively, sealing of one end of the tubing may be accomplished using a crosslinkable, polymeric composition, bondable to the material comprising the tubing, and typically liquid in the applied state, this composition being precisely metered into the pre-recovered end of the tubing, and being allowed to cure fully to the solid state. Such materials would include curable epoxies, urethanes and other suitable elastomers or thermoset materials.

The above described procedures have numerous benefits over the known procedures for manufacture of heat shrinkable end caps. One advantage is the ability to produce end caps from existing bulk reels of extruded, heat-shrinkable tubing as opposed to conventional production methods involving injection, compression, transfer or blow moulding techniques.

Moreover, the present processes offer the possibility of preparing end caps differing in one or all of the following:

(a) length. The end caps may ostensibly be of any length but typically are about 50 mm. to about 250 mm. long.

(b) thickness. Typically the fully recovered wall thickness is 0.5 in. to 5 mm.

(c) composition. The outer and inner wall of the tubular member, and plug may each be of any of a number of different compositions, as discussed above.

(d) degree of crosslinking, as discussed above.

(e) method of crosslinking, as discussed above.

(f) degree of expansion. The tubular member may preferably be expanded to an extent of about 25 to about 600%, based on the diameter of the unexpanded tubing. This provides for much higher shrink ratios than are normally possible with the known moulded products.

(g) colours. The materials of the tubular member and of the plug may each be pigmented to provide them with any of a number of similar or contrasting colours, by blending the materials with pigments as well known to those skilled in the art. This provides the possibility of denoting different grades or kinds of end caps using colour-coded tubular members and/or plugs. For particular applications the tubular member and/or the plug may be formulated to be clear and translucent or transparent.

(h) plug configuration, as discussed above.

A further advantage, in the case of the weldable plugs, is that no adhesive layer is necessary to effect an air and water-tight seal at the closed end of the cap.

The accompanying drawings show preferred forms of cable end caps in accordance with the present invention.

Figure 1:
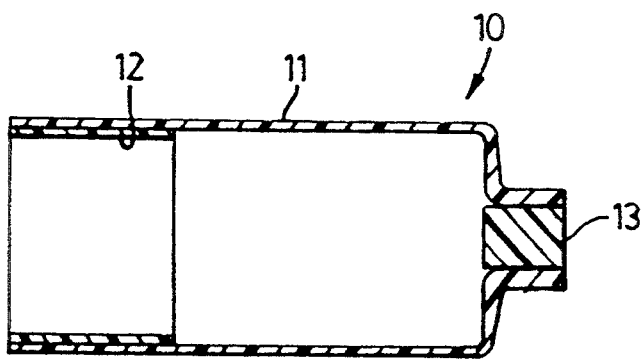
FIGS. 1, 2 and 3 show a longitudinal cross-section, an end view and a perspective view of one form of end cap in accordance with the invention.
Figure 2:
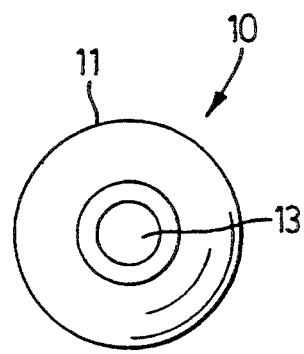
Figure 3:
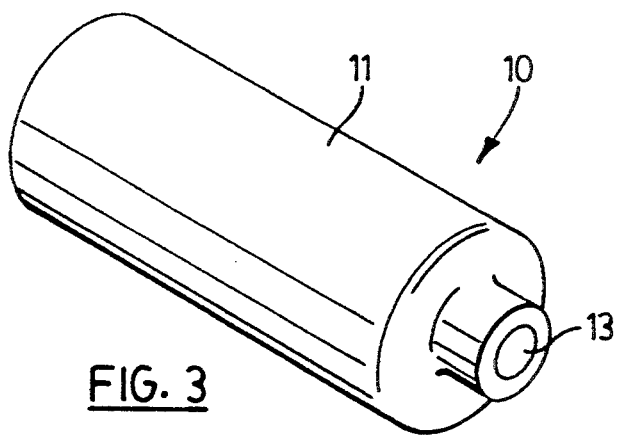

FIGS. 1 to 3 illustrate a finished, unrecovered end-cap 10 comprising a radially heat-shrinkable outer wall 11. As seen in FIG. 1, the wall 11 is internally partially coated with a layer of an adhesive material 12. One end of the cap is recovered around a weldable, heat-stable, solid, cylindrical plug 13, thereby effecting an air and watertight seal at that end.

Figure 4:
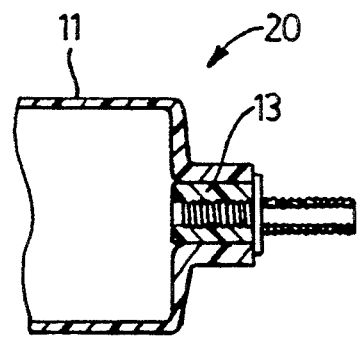
FIGS. 4, 5 and 6 show partial cross-section, end view and partial perspective views corresponding to FIGS. 1, 2 and 3, respectively of second form of a pressurisable end cap in accordance with the invention.
Figure 5:
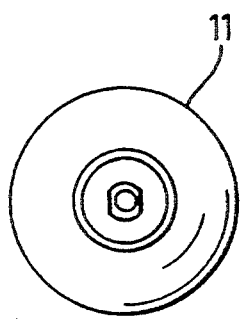
Figure 6:
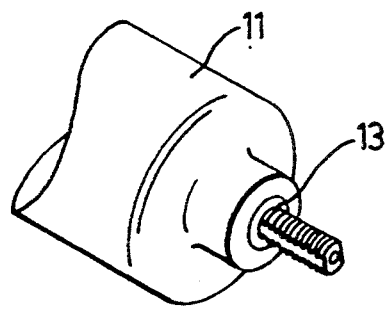

FIGS. 4 to 6, wherein like reference numerals indicate like parts, show a similar cap 20, where the plug 13 has been drilled through and a threaded stem of a pneumatic check valve 21 such as a conventional pneumatic tire valve has been threaded into the bore. After application and heat recovery onto an end of a cable, for example, the valved cap allows the cable to be gas-filled and pressurized through the valve 21 to provide a positive pressure as may be desired to maintain a moisture free condition. This is common practice with telephone cables, for instance, whose performance is adversely affected by the presence of trace moisture.

Although the above description provides ample information to allow one of ordinary skill in the art to make and use the end caps of the present invention, for the avoidance of doubt detailed examples will be given.

EXAMPLE 1

A heat-shrinkable end cap was prepared from a heat-shrinkable tubing formed from a polymeric composition based on a crosslinkable linear low density polyethylene and a concentrate comprising inorganic clay dispersed in an ethylene vinyl acetate copolymer in the approximate weight ratio of 1:1. The crosslinkable polyethylene and clay concentrate were also blended in the approximate weight ratio 1:1.

Tubing was extruded with an inside diameter of 4.4 mm. and wall thickness 2.3 mm.

The tubing was then crosslinked to a level of 55%, measured as the undissolved portion of the material remaining after refluxing in a solvent suitable for dissolving all uncrosslinked fractions of said material.

After crosslinking, the tubing was stretched by a conventional method to an inside diameter of 19 mm. and cut into discrete lengths approximately 80 mm.

Said lengths were internally coated with a hot-melt adhesive layer, based on an ethylene vinyl acetate copolymer, of length 25 mm. measured from the applied end of the tubing. The uncoated end was heated to a temperature over and above that required to effect complete shrinkage of the tubing, typically 150° C., said recovered portion being of length approximately 15 mm., this being performed simultaneously with the insertion into that end of a pre-cut 12 mm. length of cylindrical plug previously extruded as a continuous rod of diameter 6 mm. ±0.25 mm. from a blend of low density polyethylene and ethylene vinyl acetate copolymer and crosslinked to a level of 50 to 60%, and having a complex viscosity measured by mechanical spectrometer at 23° C. and strain rate of $10^{-1}$ radian $s^{-1}$ of $5.25 \times 10^9$ poise.

The temperature for shrinking the tube was achieved using a forced-air heat gun, this being sufficient to ensure softening of both the inner surface of the tubing and outer surface of the polymeric plug and effect a perfect weld between tubing and plug as the tubing recovered around the inserted plug.

After cooling to room temperature, the finished endcaps were trimmed and subjected to the following performance tests:

|  | Typical Performance |
| --- | --- |
| [1]Burst Strength, internal pressure to failure | 690 ± 30 kPa |
| Shear strength, plug-tubing weld | 4000 kPa |
| Water Tightness, pressurized (1 hr., 23° C., 276 kPa) | No pressure loss, or water ingress |
| Temperature Cycling, pressurized (8 hrs. @ 60° C., 8 hrs. @ 40° C., 106 kPa) | 50 cycles; no failure of weld |
| Heat Shock, (5 min., 250° C.) | No flowing or deformation of cap or plug |
| Cold Impact (−40° C., 1 kg.m) | No cracking or disbondment |

[1]Failure in all cases was a result of rupture of the tubing wall. No failures were seen in the weld area, this being a required performance criteria.

EXAMPLE 2

A heat-shrinkable end cap was prepared from a heat-shrinkable tubing comprising an outer layer of a 1:1 blend by weight of ethylene vinyl silane copolymer and concentrate of inorganic clay dispersed in an ethylene vinyl acetate copolymer also in the approximate weight ratio 1:1, and a co-extruded internal layer of ethylene vinyl silane copolymer formulated with a relatively lower concentration of vinyl silane component to induce a relatively lower level of crosslinking than the outer layer when the tubing is subjected to the crosslinking process.

The tubing was extruded with an inside diameter of 10.8 mm. and combined wall thickness of 3.5 mm., the outer layer accounting for 2.5 mm. of this total thickness.

The tubing was then crosslinked to a level of 55% for the outer layer and a relatively lower level for the internal layer dependent upon the relative susceptibilities of the two layers to the crosslinking process. This level is difficult to quantify as a percentage, but is sufficient to retain the structural form of the internal layer whilst allowing said layer to soften and adhere to the plug material it is subsequently recovered around.

After crosslinking, the tubing was stretched by a conventional method to an inside diameter of 40 mm. and cut into discrete lengths of approximately 80 mm.

One end of the tubing was then heated as described in Example 1 and recovered over a pre-cut 15 mm. length of crosslinked cylindrical plug previously extruded as a continuous rod of diameter 14 mm. from a blend of low density polyethylene and ethylene vinyl silane copolymer, and having a complex viscosity at 23° C. and strain rate of $10^{-1}$ radian $s^{-1}$ of $5 \times 10^9$ poise.

EXAMPLE 3

Tubing was prepared as in Example 1, and the uncoated end was heated to a temperature over and above that required to effect complete shrinkage of the tubing. The tubing was held in a vertical position with the recovered end to the bottom, said end being in intimate contact with a smooth, flat, unweldable, horizontal surface. A 2-part liquid thermoset epoxy formulation, comprising 100 parts of bisphenol A-epichlorohydrin resin and 16 parts of an ethylene diamine curing agent by weight, was pre-mixed and precisely metered into the tubing to completely fill the recovered end. The epoxy was allowed to cure to the solid state at room temperature, and the completed end caps were subjected to the following performance tests:

|  | Typical Performance |
| --- | --- |
| [1]Burst strength, internal pressure to failure | 690 ± 30 kPa |
| Water Tightness, pressurized (1 hr., 23° C., 276 kPa) | No pressure loss or water ingress. |
| Temperature cycling, pressurized (8 hrs. @ 60° C., 8 hrs @ 40° C., 103 kPa) | 50 cycles; no failure of weld. |
| Heat Shock (5 min, 250° C.) | No flowing or deformation of cap or plug. |
| Cold Impact (−40° C., 1 kg.m) | No cracking or disbondment. |

[1]Failure in all cases was a result of rupture of the tubing wall.

EXAMPLE 4

A heat-shrinkable cap was prepared generally as in Example 3, except that the inner surface of the recovered end of the tubing was coated with a layer of functional, hot-melt adhesive comprising a methacrylic acid modified ethylene copolymer, prior to the introduction of the 2-part epoxy formulation. The result was a fusion bond between the plug material and the tubing member on application of localized heat to the recovered end of the tubing.

EXAMPLE 5

A heat-shrinkable cap was prepared generally as in Example 3, except that a functional, hot-melt adhesive component consisting of a methacrylic acid modified ethylene copolymer was pre-blended in powder form with the 2-part epoxy formulation prior to its introduction into the recovered end of the tubing. The result was a fusion bond between the plug material and the tubing member on application of localized heat to the recovered end of the tubing.

We claim:

1. A heat shrinkable end cap comprising a dimensionally heat unstable tubular member of crosslinked polymeric material, said member shrinking in perimeter on application of heat thereto, and having one end heat recovered to a small perimeter relative to an opposite open end of large perimeter, said one end being closed by a discrete plug of polymeric material that tends not to yield under pressure applied by shrinking polymeric material at said one end and upon application of said heat and is welded to said one end, said plug having a complex viscosity greater than $10^9$ poise when measured at a temperature of 23° C. and a strain rate of $10^{-1}$ radian $s^{-1}$.

2. A cap as claimed in claim 1 wherein the plug has an outer perimeter equal to or greater than an inner perimeter of the tubular member when fully shrunk.

3. A cap as claimed in claim 1 wherein the tubular member is crosslinked to a degree of about 20% to about 90%.

4. A cap as claimed in claim 3 wherein the degree of crosslinking is about 40% to about 70%.

5. A cap as claimed in claim 1 wherein the tubular member has a degree of expansion of about 25 to about 600% based on the perimeter of the unexpanded member.

6. A cap as claimed in claim 5 wherein said degree of expansion is about 100% to about 300%.

7. A cap as claimed in claim 1 wherein the tubular member has an internal coating part way along its length from said first end portion, said coating comprising adhesive, sealant, mastic or bonding agent.

8. A cap as claimed in claim 7 wherein said coating extends for about 10 to about 50% of the length of the cap.

9. A cap as claimed in claim 1 wherein the tubular member is co-extruded with an internal adhesive layer.

10. A cap as claimed in claim 1 wherein said plug has an elastic modulus measured in accordance with ASTM D882 of up to about $10^8$ kPa.

11. A cap as claimed in claim 10 wherein said elastic modulus is up to about $10^6$ kPa.

12. A heat shrinkable end cap comprising a dimensionally heat unstable tubular member of crosslinked polymeric material, said member being capable of shrinking in perimeter on heating above a temperature at which shrinkage of said member commences, and having one end heat recovered to a small perimeter relative to an opposite open end of large perimeter, said one end being closed by a discrete solid plug that is infusible at a temperature above said temperature at which shrinkage commences and having a complex viscosity greater than $10^9$ poise when measured at a temperature of 23° C. and a strain rate of $10^{-1}$ radian $s^{-1}$, and that is bonded to said one end.

13. A cap as claimed in claim 12 wherein said complex viscosity is at least about $2 \times 10^9$ poise.

14. A cap as claimed in claim 12 wherein said complex viscosity is at least about $4 \times 10^9$ poise.

15. A cap as claimed in claim 12 wherein said plug has an elastic modulus measured in accordance with ASTM D882 of up to about $10^8$ kPa.

16. A cap as claimed in claim 15 wherein said modulus is up to about $10^8$ kPa.

17. A cap as claimed in claim 12 wherein the plug has an outer perimeter equal to or greater than the inner perimeter of the tubular member when fully shrunk.

18. A cap as claimed in claim 12 wherein the tubular member and the plug are each crosslinked to a degree of independently about 20% to about 90%.

19. A cap as claimed in claim 18 wherein the degree of crosslinking is about 40% to about 70%.

20. A cap as claimed in claim 12 wherein the tubular member has a degree of expansion of about 25 to about 600% based on the internal diameter of the unexpanded member.

21. A cap as claimed in claim 20 wherein said degree of expansion is about 100% to about 300%.

22. A cap as claimed in claim 12 wherein the tubular member has an internal coating comprising an adhesive, sealant, mastic or bonding agent.

23. A cap as claimed in claim 22 wherein said coating extends for about 10 to about 50% of the length of the cap.

24. A cap as claimed in claim 12 wherein the tubular member is co-extruded with an internal adhesive layer.

25. A cap as claimed in claim 12 wherein the plug comprises a foam, a glass, a metal, a ceramic, or a composite material.

* * * * *